United States Patent [19]
Bodonyi

[11] 3,727,152
[45] Apr. 10, 1973

[54] SIGNAL COMBINER OR DIVIDER FOR DIFFERING FREQUENCIES

[75] Inventor: Janos Bodonyi, Bickacre, England

[73] Assignee: The Marconi Company Limited, London, England

[22] Filed: June 28, 1971

[21] Appl. No.: 157,308

[30] Foreign Application Priority Data

July 9, 1970 Great Britain.....................33,300/70

[52] U.S. Cl...........................333/6, 333/10, 333/95 R
[51] Int. Cl...............................................H01p 5/12
[58] Field of Search...........................333/6, 9, 10, 11, 333/95 R, 98 R; 343/854

[56] References Cited

UNITED STATES PATENTS

| | | | |
|---|---|---|---|
| 3,267,472 | 8/1966 | Fink | 343/854 X |
| 3,480,958 | 11/1969 | Tcheditch | 343/854 X |
| 3,490,054 | 1/1970 | Seidel | 333/10 |
| 3,034,076 | 5/1962 | Tomiyasu | 333/10 X |
| 3,613,034 | 10/1971 | Lind et al. | 333/98 R X |

OTHER PUBLICATIONS

The International Dictionary of Physics & Electronics, Van Nostrand Co., Princeton, N.J., 1961, Title pages and pages 227 & 228 relied on, QC515

*Primary Examiner*—Paul L. Gensler
*Attorney*—Donald M. Wight et al.

[57] ABSTRACT

An electrical signal combiner or separator for combining signals of different frequencies for transmission along a common signal path or for separating similar signals received over a common signal path consists of devices formed by grooving in a block structure and interconnected by other grooving similarly formed in the block, the devices being arranged in sets each of a different number, the numbers in the sets increasing by a factor of two, and one set consisting only of one device, each pair of devices in any set (except that consisting of one device) having two parts, one in each device, connected through two grooves to two of the ports of a device in another set.

8 Claims, 4 Drawing Figures

Figure 1:
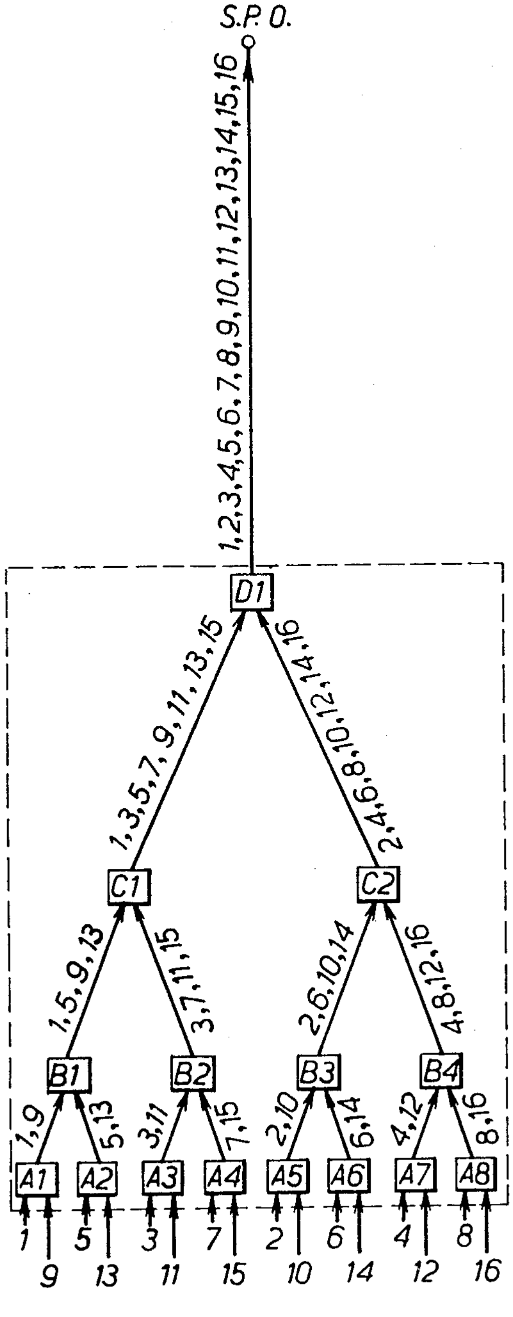

INVENTOR
Janos Bodonyi
BY
Baldwin Wight & Brown
ATTORNEYS

INVENTOR
Janos Bodonyi
BY
Baldwin Wight & Brown
ATTORNEYS

SIGNAL COMBINER OR DIVIDER FOR DIFFERING FREQUENCIES

This invention relates to electrical signal combining and separating arrangements suitable for use in multiplex communication systems, i.e. in communication systems in which, at the transmitting end, signals appropriate to a plurality of signal information channels are combined for transmission over a single path at the receiving end of which the channels are separated for feeding each into its own receiver. As an example of a system to which the invention is advantageously though not exclusively applicable may be mentioned the well known frequency division multiplex systems in which each channel contains a number of telephone and/or video signals already combined and pulse code modulated.

Present usual practice at the receiving end of a frequency division multiplex system is to provide, in the single path carrying the plurality of channels, a corresponding plurality of filters, each selective of a different frequency, one behind the other in said path, and to take off the separate channels from the separate filters. In practice it is necessary also to provide, between each two successive filters, a frequency selective rejection filter or device in order to ensure that signals appropriate to one channel shall not proceed past the filter intended for taking off that channel and thus interfere with signals appropriate to channels which are intended to be separated out by filters further down the signal path. Such an arrangement is complex, difficult to design and costly and, moreover, because the further down the signal path any given channel separating filter is situated, the more separating filter units signals appropriate to that channel have to pass, considerable difficulties are experienced in avoiding serious distortion due to differential attenuation and group delay effects. The combining means at present generally employed at the transmitting end to combine the different channels for transmission along the common signal path have generally similar defects. The present invention seeks to provide improved electrical signal combining and separating arrangements which will avoid the foregoing defects.

According to this invention an electrical signal combining or separating arrangement for combining a plurality of signals of different frequencies for transmission along a common signal path or for separating a plurality of signals of different frequencies received over a common signal path comprises a plurality of devices constituted each by portions of waveguide formed in a block structure and interconnected by other portions of waveguide also formed in said block, said commutators being arranged in sets each of a different number of devices, the numbers in the different sets increasing by a factor of two, and one set consisting only of a single device, each pair of devices in any set (except that consisting of one device) having two parts, one in each device, connected through two of said other portions of waveguide to two of the ports of a device in another set. By the term "device" as used throughout the specification is meant two power splitting devices (each having four ports) such as 3dB couplers, rat races, magic tees or combinations thereof and two output ports and so arranged that input signals of different frequencies applied each to the same input port of the whole arrangement are alternately switched to different output ports as a function of frequency, the arrangement being reciprocal.

The devices could be formed by H-guides arranged as known per se in predetermined proximity to each other. Preferably, however, the devices and waveguides are formed by grooving in the block.

Preferably each device comprises first and second 3dB couplers joined by two unequal lengths of waveguide one of which provides between the ends thereof a phase shift which differs at a predetermined frequency by 180° or an odd multiple thereof (i.e. 540°, 900° and so on) from that provided between the ends of the other.

Preferably the 180° or multiple phase shift is obtained by providing a loop in the run of said one portion of waveguide. Preferably one of the output ports of the second 3dB coupler is terminated by a matched load and the other output opens into an interconnecting portion of waveguide which is a straight continuation of the portion of waveguide at the end of which said port is situated, said interconnecting waveguide portion connecting said further port to one of the pair of ports at one end of a device in another set.

The device and the interconnecting waveguide portions may be constituted by grooving in a metal block structure or they may be constituted by grooving in an insulating block structure having grooves with metal coated surfaces.

The block structure may be constituted by two slabs with open grooving in one the mirror image of open grooving in the other, the two slabs being assembled with the open sides of the grooving together so as to constitute a block structure with waveguide portions therein. In another construction, the block structure is constituted by a block with grooving therein which opens into one face thereof, a lid member being provided for assembly on said face to close the open grooving and provide a block structure with guide portions therein.

Preferably 3dB coupling is provided in the device by transverse slotting of the block structure material.

Figure 2:
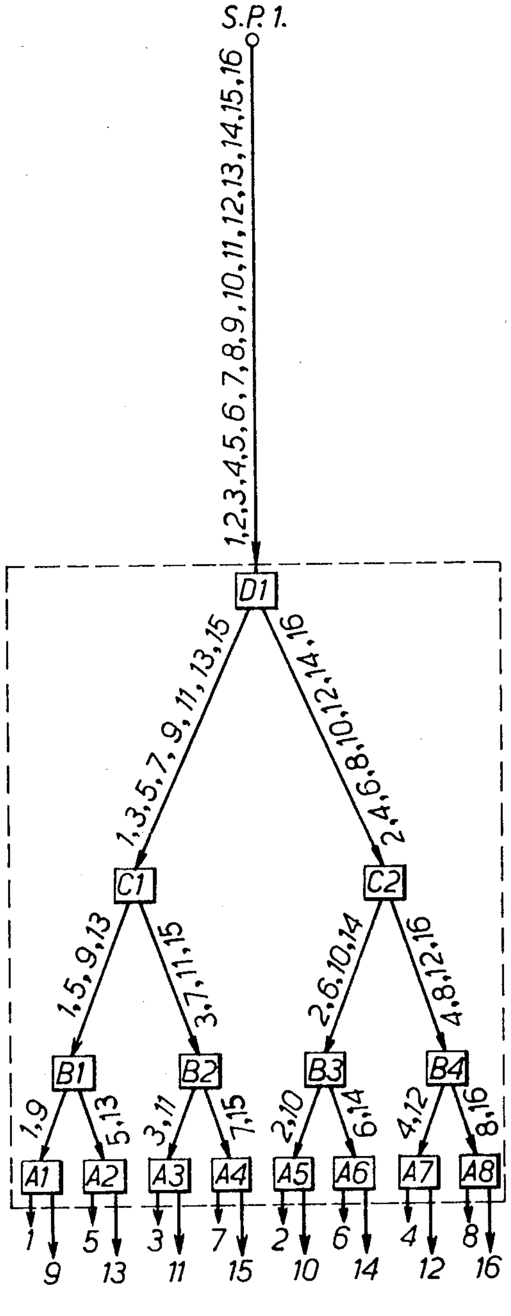
Figure 3:
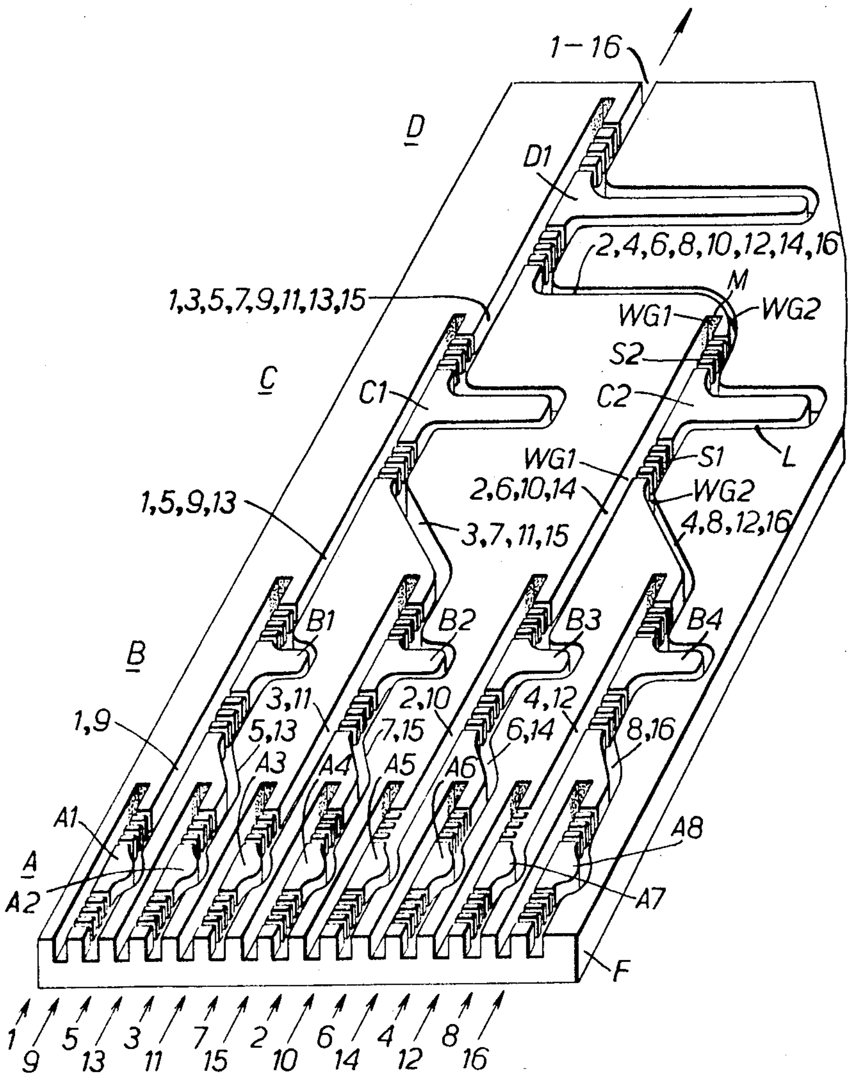
Figure 4:
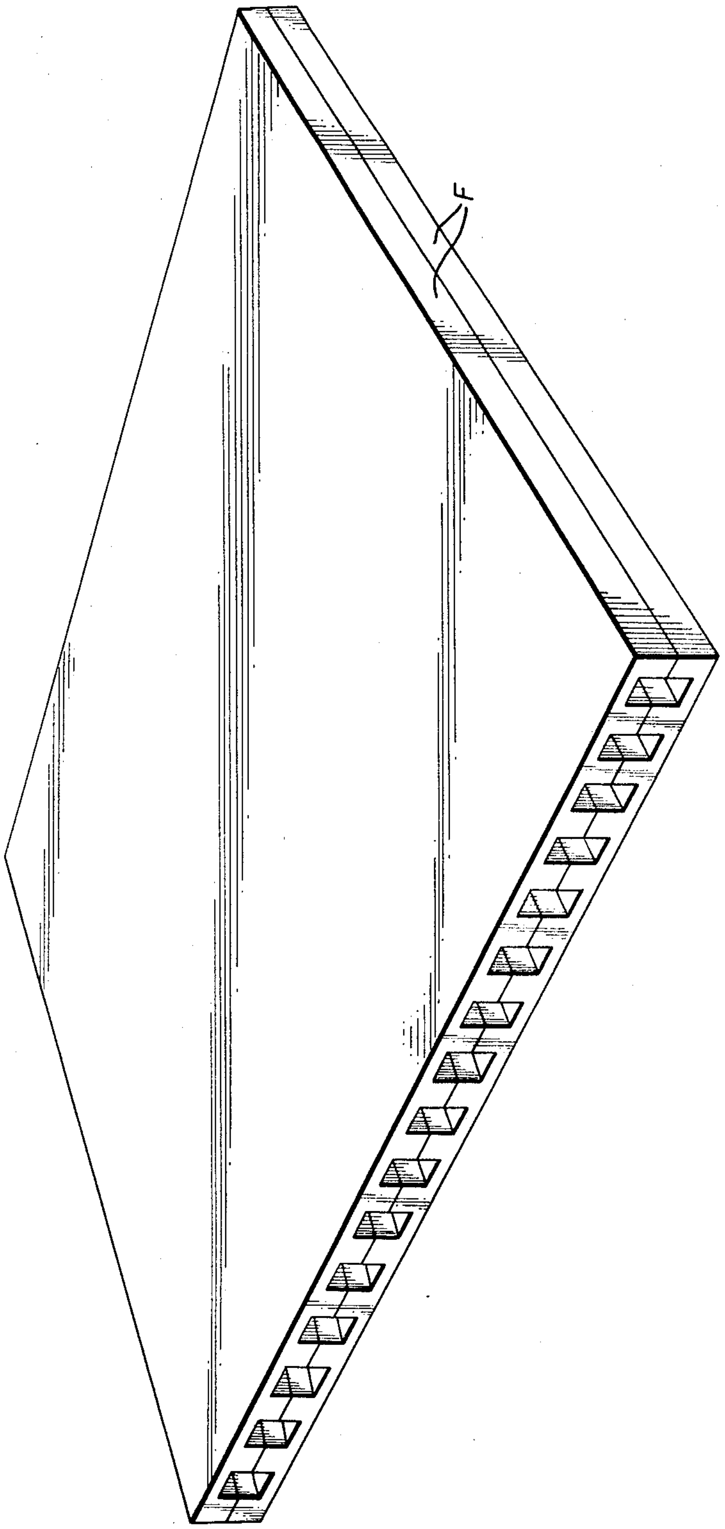

The invention is illustrated in and further explained in connection with the accompanying drawings in which FIGS. 1 and 2 are diagrams, provided for purpose of explanation and showing the electrical circuits of a signal combining arrangement (FIG. 1) and of a signal separating arrangement (FIG. 2) suitable for use at the transmitting and receiving ends, respectively, of a frequency division multiplex telephone system; and FIG. 3 is a perspective view showing an embodiment of this invention (suitable for use to provide circuitry as shown in FIG. 1 or in FIG. 2) with the lid cover removed; and FIG. 4 is a perspective view of slabs assembled to form the invention. Like references denote like parts in the drawings.

Referring to FIG. 1 the system assumed here is one with 16 channels indicated by numbers shown at the inputs 1 to 16, although of course, the invention is not limited to its application to 16-channel systems.

Signals at different serial frequencies are applied as shown to the sixteen ports of a set of eight devices each having two input ports. These ports are numbered in accordance with the channel numbers as follows, in odd number channels in pairs 1, 9; 5, 13; 3, 11; and 7, 15 being applied to devices A1 to A4 and even numbered channels in pairs 2, 10; 6, 14; 4, 12; and 8, 16 being applied to devices A5 to A8. Each pair of devices in the first set A1 to A8, provides from its output ports, of which each device has one, input to a different device of a second set B1 to B4. Thus A1 and A2 feed into B1, A3 and A4 into B2, and so on. Each output from a device in the first set combines, in its interconnection to a device in the second set, two channels. Thus A1 feeds channels 1 and 9 to one input port of B1: A2 feed channels 5 and 13 to the other input port of B1 . . . . and so on as indicated by the reference in the figure.

The third set of devices consists of two devices C1 and C2 which are associated with the devices of the second set in manner similar to that in which those of the said second set are associated with those of the first. Each output from a device in the third set thus combines eight channels e.g. the interconnection from C1 to the device D1 (which constitutes the only device in the fourth set) carries the channels 1, 3, 5, 7, 9, 11, 13 and 15, the remaining (even numbered) eight channels being fed from C2 to D1. All 16 channels thus appear at the input of D1 and are suitably transmitted over a signal path (not shown) fed from the terminal SPO.

At the receiving end of the signal path the sixteen channels appear at the input terminal SP1 of a separator which is represented in FIG. 2 and is the counterpart of the combiner shown in FIG. 1. The method of referencing used in FIG. 2 is similar to that used in FIG. 1 and, in view of this, FIG. 2 will be thought self-explanatory. In fact the only difference between FIGS. 1 and 2 lies in the directions of signal flow- indicated in the figures by arrow heads- and, structurally, a combiner for use as an apparatus as represented in FIG. 1 may be identical with that of a separator for use as an apparatus as represented in FIG. 2. FIG. 3 shows such a combiner or separator in accordance with this invention. For convenience FIG. 3 will be described in what follows as though it were a combiner.

Referring to FIG. 3, F is a solid metal slab in which rectangular sectioned grooving is machined or otherwise formed. Instead of using a solid slab of metal a solid slab of dielectric with grooving, formed therein and metallized on the walls of the grooving could be used. The grooving is formed, as will later be described, to provide four sets of devices, one of eight, one of four, one of two and one of one. These sets are represented by the letters A, B, C and D as indicated by these letters down one edge of the block in FIG. 3. The individual devices are indicated by the references A1 to A8, B1 to B4, C1 to C2 and D1. The interconnections between devices are indicated, in FIG. 3 as in FIG. 1, by the channels they carry.

Each device (so as not to complicate the drawing references relating to the devices structure now to be described are applied to devices C2 only) contains two portions $WG_1$ and $WG_2$ of waveguide. $WG_2$ has a loop L formed therein, this loop being of electrical length such that the phase shift suffered by the frequencies fed in at the input end of $WG_2$ in passing down $WG_2$ to the output end thereof, differs from that suffered by said frequencies in passing from input to output of $WG_1$ by 180° or odd multiples thereof. The two portions $WG_1$ and $WG_2$ join two 3dB couplers as indicated at S1 and S2 adjacent the input ends and the output ends of the two portions. The input ends of the two waveguide portions constitute a pair of ports of the devices and the output end of the electrically longer portion $WG_2$ constitutes the further or output port of the device. The remaining end of $WG_1$ is closed and forms a matched load termination M as known per se. All the devices are similar except of course, for the lengths of the loops L that produce the required phase shift. Since the devices in the different sets carry different sets of frequencies the loop L will vary in length depending on frequency difference of adjacent input frequencies in the device. Thus the loops L in the set A will be shortest since the frequency difference is longest i.e. a difference of 1-9, 5-13, 8-16 for a spacing of 8 serial frequency numbers, those in the devices of set B being longer, those in the device of set C being still longer and that in the single device of set D being longest since the spacing is least i.e. 1-2, 15-16-1 serial frequency number.

The grooving in FIG. 3 opens into the top face of the slab i.e. the face which is uppermost in the drawing. To complete the structure a flat metal lid (not shown) is fitted over this face, thus transforming the grooving into waveguides, and held e.g. by screws through the lid and screwing into threaded holes (not shown) in the slab. FIG. 4 illustrates two of the slots F having mirror image grooving and assembled in face-to-face relation to form a complete device.

As will now be appreciated the invention can be embodied in very compact structures. For example in one practical structure as illustrated in FIG. 3, the slab was 15 inches long by 10 inches wide by ⅝ inch thick; the individual waveguide grooves were 0.112 inch wide by 0.224 inch deep; the least distance between the two waveguide portions of a device was 0.125 inch; the longest loop L (in device D1) was approximately 9 inches (from the two ends of the U shaped loop to the base of the U), the corresponding loop lengths in devices C, B and A being approximately 4 inches, 2 inches and 1 inch respectively.

I claim:

1. Apparatus for combining or for separating a plurality $2^n$ of signals of $2^n$ serially different frequencies comprising in combination;

a plurality $n$ of sets of power splitter devices formed in a single block of material, the first set containing one device, the next set containing two devices, the next set containing four devices and so on to the $n$th set which contains $2^{n-1}$ devices; each device comprising a pair of waveguides defining a pair of ports at one end, a further port at the opposite end and a load termination at said opposite end, in which one waveguide leads from one of said pair of ports to said load termination and the other of said waveguides leads from the other of said pair of ports to said further port, a pair of 3db couplers connecting said waveguides between the opposite ends thereof to define a first waveguide length between such couplers in said one waveguide and a second waveguide length between such couplers in said other waveguide in which said first and second lengths are unequal, the first and second waveguide lengths being the same for all devices of a set and the second waveguide lengths being progressively smaller from the first to the $n$th set;

said $2^n$ signals being coupled individually with the ports of said pairs of ports of the devices of the $n$th set with the first $2^{n-1}$ signals being coupled with the said one ports of said pairs of ports and the remaining signals being coupled with the said other ports of said pairs of ports and with each pair of ports having those signals coupled thereto which differ in the series by $2^{n-1}$, said further ports of said $n$th set being coupled individually to said ports of said pairs of ports of the $n-1$th set such that the signals coupled to the said one port of each device of said $n-1$th set are serially lower than the signal coupled to the other port by $2^{n-2}$, and so on to the device of the first set; and said second waveguide lengths of the $n$ sets being of lengths to cause those signals coupled between the other ports of said pairs of ports and said further ports to suffer a phase shift of $m180°$, where $m$ is an odd integer, while those signals coupled between said further ports and said one port of said pairs of ports suffer a phase shift of $k360°$ where $k$ is zero or any integer.

2. An arrangement as claimed in claim 1 wherein the devices are formed by H-guides in proximity to each other.

3. An arrangement, as claimed in claim 1 wherein the device and the interconnecting waveguide portions are constituted by grooving in a metal block structure.

4. An arrangement as claimed in claim 1 wherein the device and the interconnecting waveguide portions are constituted by grooving in an insulating block structure having grooves with metal coated surfaces.

5. An arrangement as claimed in claim 1 wherein 3dB coupling is provided in the devices by transverse slotting of the block structure material.

6. An arrangement as claimed in claim 1 wherein the devices and waveguides are formed by grooving in the block.

7. An arrangement as claimed in claim 6 wherein the block is constituted by two slabs each having open grooving in which the grooving in one slab is the mirror image of the open grooving in the other, the two slabs being assembled with the open sides of the grooving together so as to constitute a block structure with waveguide portions therein.

8. An arrangement as claimed in claim 6 wherein the block is constituted by a block with grooving therein which opens into one face thereof, a lid member being provided for assembly on said face to close the open grooving and provide a block structure with guide portions therein.

* * * * *